June 12, 1923.

E. ANDERSON

STORAGE BATTERY

Original Filed Nov. 18, 1919

1,458,377

WITNESSES:
F. O. Ellerman.

INVENTOR.
Edward Anderson,
By Kerr, Page, Cooper & Hayward,
ATTORNEYS.

Patented June 12, 1923.

1,458,377

UNITED STATES PATENT OFFICE.

EDWARD ANDERSON, OF DAYTON, OHIO, ASSIGNOR, BY MESNE ASSIGNMENTS, TO THE A. A. SIMONDS-DAYTON COMPANY, OF DAYTON, OHIO, A CORPORATION OF OHIO.

STORAGE BATTERY.

Application filed November 18, 1919, Serial No. 338,692. Renewed January 24, 1923.

*To all whom it may concern:*

Be it known that I, EDWARD ANDERSON, a citizen of the United States, residing at Dayton, Montgomery County, Ohio, have invented certain new and useful Improvements in Storage Batteries, of which the following is a full, clear, and exact description.

My present invention relates to what is known as secondary or storage batteries, and among other objects is to overcome certain serious difficulties which have always obtained in such batteries.

Figure 1:
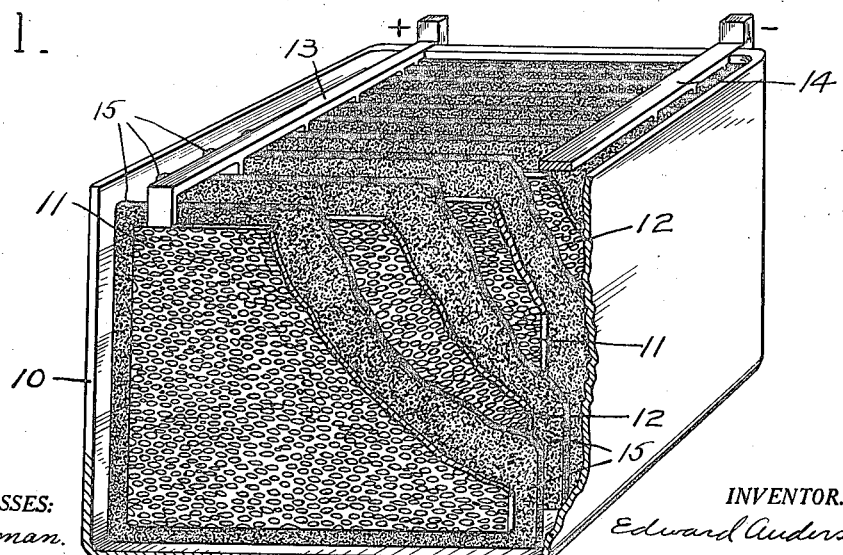

One of these difficulties or problems is that of properly separating the elements or plates of the battery without increasing its internal resistance unduly. Another is that of preventing the formation of metallic lead between the plates and the short circuiting of the battery thereby. Another is that of supporting or restraining the plates so as to prevent their distortion or "warping" as it is commonly called. These and other valuable results are obtained by means of the construction which I am about to describe, the same being illustrated in the accompanying drawing, in which Fig. 1 shows a storage battery of a conventional type, but embodying my improvements. In this figure portions of the containing vessel are removed and parts of the elements have been broken away.

Figure 2:
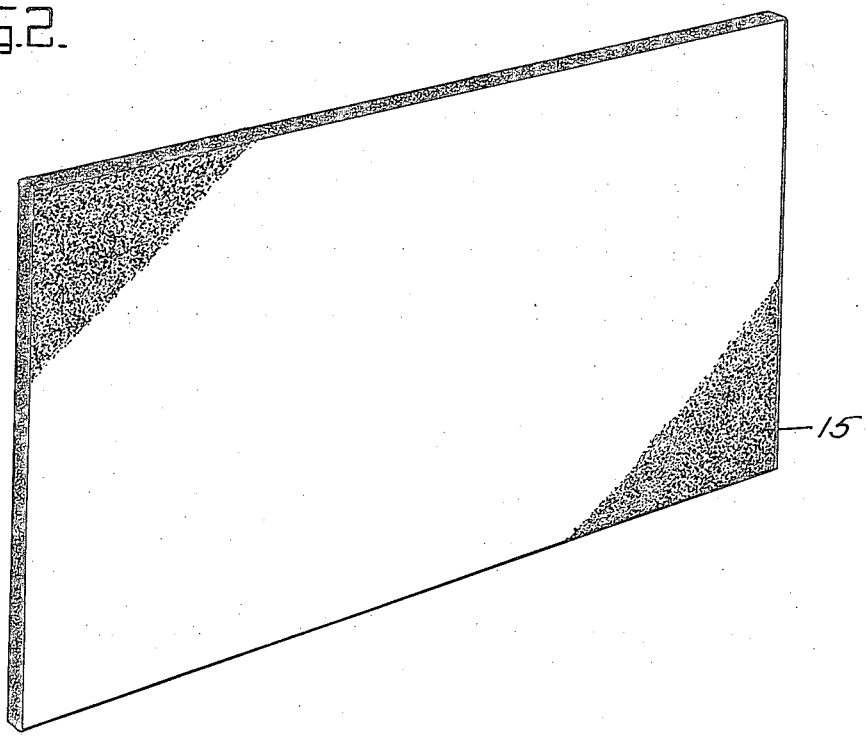

Fig. 2 is a perspective view of the separator by which the battery plates are kept apart.

Referring now to Fig. 1 the container 10 is composed of glass, hard rubber or any suitable insulating, water and acid-proof substance. Within the container are a series of positive plates 11 and a series of negative plates 12, the former being connected to a bus bar 13 and the latter to a bus bar 14. The positive and negative plates are arranged alternately, so that with the exception of the end plates, each positive plate is between two negative plates, and each negative plate is between two positive plates. Between each two plates is a separator 15 whose principal function is to prevent the plates coming into contact with each other. The container 10 is filled with the usual acid solution. This battery does not differ materially in its general construction from batteries now in common use, except in the character of the separator 15. These are novel, and because of certain unique characteristics enable the battery to produce better results and render more effective service than batteries now in use. I shall now describe my separator, but wish first to enumerate certain qualities which a separator is required to have.

A separator should interpose a strong mechanical barrier between the battery plates, capable of preventing the plates "buckling"; i. e., becoming distorted when the battery is discharged at a high rate, and which will prevent detachment of particles of lead oxide from the positive plate and their conversion into metallic lead. At the same time it must impede as little as possible the electrolytic action of the cell. Heretofore thin sheets of wood have been employed in the attempt to meet these rather conflicting requirements, the wood having some mechanical strength and being somewhat porous, but the wood is admittedly deficient in both of these requirements. It does not have the desired mechanical strength, and it deteriorates rapidly in the battery and requires frequent renewal. Furthermore, its porosity is deficient, which results in the internal resistance of the battery being too high, this in turn not only causing loss of energy and lowering the efficiency of the battery, but lowering the current rate at which the battery can be discharged, making it necessary to use a larger and therefore heavier battery to obtain a given output of energy than would be necessary if the internal resistance of the battery were lower.

My separator is a porous vitrified ceramic product, made of a suitable granular basic material held together with a vitrified bond. I have found granulated aluminous oxide an excellent material for the purpose, and for a bond prefer a vitreous clay. The granular basic material and clay, in desired proportions, are mixed together and molded into slabs of the required size and thickness; the slabs are then embedded in quartz sand and placed in a kiln, where they are heated to the point necessary for fusing the clay, which acts as a cement and holds the grains of basic material together. This forms a very hard and strong separator. The grains of basic material, though preferably more or less uniform in size, are irregularly formed bodies bounded by variously shaped facets. In a quantity of such material the grains contact with each other principally at corners and the smaller facets, which results in there being interstices of various shapes and sizes between the grains. The bonding clay, which is preferably pulverized, fills these interstices partially, more or less according to its quantity, the remainder of the space being vacant. When the clay is fused it adheres to the grains and in this way unites the materials into a single mass. The porosity of the separators is the result of the interstices between the grains of the granular basic material of which they are made being more or less connected, so as to form a system of tortuous pores or foramina extending through the separator from one side to the other. Attempts have been made to use separators made of hard rubber and other substances having perforations drilled or otherwise made through them. These have failed because of the formation of metallic lead in these direct apertures, which ultimately "short-circuits" the plates. The indirectness of the pores in my separators, together with their diminutiveness, prevents the formation in them of these outgrowths of metallic lead. Even if such growths should begin they would necessarily become so attenuated that they could not penetrate the separator far, to say nothing of reaching the other side. The pores are so small that they leave practically no particle of the oxide free to become detached from the plate, but they are so numerous as to permit almost unimpeded electrolysis. The size of the pores may be varied by varying the size of the grains of basic material; also by varying the quantity of the vitreous bonding material. These things may be so co-ordinated to the thickness of the separators, that a uniform internal resistance may be established and maintained for all sizes of batteries. In fact, the control which may be exercised over the porosity and other physical characteristics of these separators is a very valuable feature of my invention. My separators may be made of any size and thickness required. While, as I have said before, they do not deteriorate by use, if it should be found that their porosity has become impaired from an accumulation in their pores of sediment or any other matter, they may be cleaned and restored to their full and original efficiency by being heated to a red or even white heat, which because of their refractory nature may be done with impunity. It is to be understood, however, that there is nothing about my separators which renders them more subject to impairment than others, for on the contrary they are much less liable to be affected by extraneous causes. Being composed of refractory minerals they are practically indestructible and will outlast not only the first but successive sets of battery plates.

Separators made in the manner described meet all of the requirements above described. They have an abundance of mechanical strength and the required insulating or dielectric qualities. They suffer practically no deterioration while in the battery and rarely if ever need be renewed. On the other hand their great porosity facilitates electrolyses, and batteries equipped with them have a very low internal resistance. I prefer to make my separators with plane surfaces on both sides, as they confine the lead oxide and prevent disintegration of the plates. As a battery discharges there is a tendency for particles of lead oxide to detach themselves from the positive plate, and these particles then turn to metallic lead and gravitate to the bottom of the cell. This disintegration or decomposition, which gradually dissipates the active element of the plate, is impeded by the flat surface of the separator lying in intimate contact with the plate. The porosity of the separator permits this confinement of the oxide without in any degree impairing the action of the battery.

While I have used the terms "porous" and "porosity," the word foraminous describes the characteristics of my separator better perhaps than "porous." Aluminous oxide is an imporous, and also impervious, substance, and the "porosity" of my separators is due to the small tortuous passages or foramina formed by the communicating interstices between the grains, which is different from the porosity of wood and other substances that are inherent in their texture. Wood separators swell when they become wet and shrink and crack if allowed to dry out, and are then useless. My separators are not affected in anyway by being in the solution, and they may be taken out of the solution and left out for an indefinite time with impunity. While I have only mentioned aluminous oxide as the basic material I do not want it to be understood that my invention is limited to this substance, as others which have the required properties may be used. Nor do I limit myself to the conventional form of battery shown, it being understood that batteries may be made in other forms, with ceramic separators such as I have described between the elements.

I have referred but briefly to any method of making my separators, for the reason that methods of making ceramic products are well known in the art, especially in the manufacture of such articles as grinding wheels. The same methods which have been found successful in the manufacture of grinding wheels, especially very thin wheels, are applicable to the manufacture of my separators. But I have invented a new method of making battery separators and other ceramic products, which method is disclosed and claimed in my application filed August 21, 1919, Serial No. 318,910. This method not only overcomes certain difficulties which have heretofore troubled manufactures of ceramic products, but it imparts to the products unique and valuable characteristics.

My new method consists in mixing the granular basic material, the bonding material, pulverized, and a suitable quantity of phenol resin, also pulverized, thoroughly in a dry state, and placing the mixture in a mold, where it is subjected to pressure and heated to a temperature sufficient to liquify the resin. After cooling, the separators are removed from the molds. They are then embedded in quartz sand and placed in a kiln in the usual way where the heat is raised slowly to the point necessary for fusing the vitreous bonding material. While the proportions may be varied to secure desired results, the following have been found satisfactory: Granulated aluminous oxide, 1000 parts; vitreous clay, 400 parts; phenol resin, 54 parts. The resin serves two purposes. First, it acts as a temporary binder to hold the basic and bonding material together until the articles are embedded in the quartz sand and put into the kiln. The second and more important function of the resin is to carry the bonding material into the smaller interstices of the mass, leaving the larger interstices vacant. The resin liquifies at 350° F., or thereabouts, and it volatilizes in the neighborhood of 1200° F. Under the influence of capillary attraction the liquefied resin seeks the smaller interstices and carries the bonding material with it. That is, the pulverized bonding material floating in the fluid resin goes where the fluid goes. This conflux begins and is probably more or less completed while the mass is in the mold, depending upon the temperature to which the mass is heated. After the separators are in the kiln the resin volatilizes gradually and as its volume diminishes it tends more and more to seek the smaller crevices between the grains, the bonding material, which is still in a pulverized state being carried with it. The resin finally vanishes, leaving only the bonding material between the grains of the basic material, the composition of the product being. therefore, the same as though no resin has been used.

The bonding material does not become fluid when it fuses; at most it attains a viscous, ropy consistency, and it is substantially immobile. Therefore, unless it is concentrated in the smaller interstices before it it fused it will not get there, as there is nothing to take it there. It occupies the large and small interstices indiscriminately, and when fused it simply remains where it is. This results in the bond assuming a tenuous, sponge-like character. In order to produce an article of given strength it requires more bonding material where it is distributed indiscriminately through the mass than where it is confined to the smaller interstices, with resulting decrease in the porosity of the article. Therefore, by means of my new method separators can be made which are very porous and yet very strong. Furthermore, the separators can be made more uniform, especially with respect to their porosity, by my new method than by other methods.

The characteristics of my separators, especially their porosity, may be varied by varying the proportions of basic and bonding material, also by varying the size of the granules of basic material. As I have said before, other substances than aluminous oxide may be used as a basic material. Silicon carbide, for example, may be used.

What I claim is as follows:

1. A separator for storage battery plates, composed of a granulated refractory material and a vitrified bond.

2. A separator for storage battery plates, composed of a granular refractory substance, the grains of which are united by a vitreous substance which occupies only a portion of the interstices between the grains, the unoccupied interstices forming foramina which extend from one side of the separator to the other.

3. A separator for storage battery plates, composed of a granular refractory substance whose grains are united by a vitreous substance which occupies only a portion of the interstices between the grains, the unoccupied interstices forming an intricate system of tortuous foramina extending through the separator from one side to the other.

4. A separator for storage battery plates, consisting of a flat slab composed of a granular refractory substance, the grains of which are united by a vitreous substance which occupies only a portion of the interstices between the grains, the unoccupied interstices forming an intricate system of tortuous foramina extending through the separator from one side to the other.

5. A separator for storage battery plates, consisting of a slab having two plane surfaces, composed of a granular refractory substance the grains of which are united by a vitreous substance which occupies only a portion of the interstices between the grains, the unoccupied portions forming an intricate system of tortuous foramina extending through the separator from one side to the other.

6. A separator for storage battery plates, composed of an imporous and impervious granular substance, having foramina formed by the interstices between the grains of said substance.

7. A separator for storage battery plates, composed of an imporous and impervious substance in granular form, integrated by a bonding material which cements the grains together while occupying only a portion of the interstices therebetween.

8. A storage battery comprising a positive and a negative element, between which is a separator composed of a granulated imporous and impervious substance, integrated by a bonding material which cements the grains together while leaving a substantial portion of the interstices between the grains unoccupied and forming an intricate system of foramina which traverse the separator.

9. A separator for storage battery plates, composed of a granulated refractory substance bound together by a vitreous substance which occupies the smaller interstices between the grains, the larger interstices being void and more or less connected so as to form an intricate system of tortuous pores extending through the separator from one side to the other.

10. A separator for storage battery plates, composed of a granular refractory substance, the grains of which are united by a vitreous substance which occupies only the smaller of the interstices between the grains, the larger interstices being vacant and forming foramina which extend from one side of the separator to the other.

In testimony whereof I affix my signature in the presence of two subscribing witnesses.

EDWARD ANDERSON.

Witnesses:
F. K. FASSETT,
W. L. JAEKLE.